(12) United States Patent
Zhang et al.

(10) Patent No.: US 9,331,532 B2
(45) Date of Patent: May 3, 2016

(54) PERMANENT MAGNET ROTOR BRUSHLESS MOTOR

(75) Inventors: Yong Zhang, Shenzhen (CN); Joseph Youqing Xiang, Canton, MI (US); Hua Yong Wang, Shenzhen (CN); Yue Li, Hong Kong (CN)

(73) Assignee: Johnson Electric S.A., Murten (CH)

( * ) Notice: Subject to any disclaimer, the term of this patent is extended or adjusted under 35 U.S.C. 154(b) by 482 days.

(21) Appl. No.: 13/540,381

(22) Filed: Jul. 2, 2012

(65) Prior Publication Data

US 2013/0002081 A1 Jan. 3, 2013

(30) Foreign Application Priority Data

Jun. 30, 2011 (CN) .......................... 2011 1 0185544

(51) Int. Cl.
| | | |
|---|---|---|
| *H02K 1/27* | (2006.01) | |
| *H02K 21/12* | (2006.01) | |
| *H02K 21/14* | (2006.01) | |
| *H02K 21/02* | (2006.01) | |

(52) U.S. Cl.
CPC ............ *H02K 1/2766* (2013.01); *H02K 1/2773* (2013.01); *H02K 21/024* (2013.01); *H02K 1/27* (2013.01); *H02K 21/12* (2013.01); *H02K 21/14* (2013.01)

(58) Field of Classification Search
CPC ..... H02K 1/27; H02K 1/2773; H02K 1/2766; H02K 21/024; H02K 21/12; H02K 21/14
USPC .......................... 310/156.38, 156.53, 156.56
IPC .................................. H02K 1/27, 21/12, 21/14
See application file for complete search history.

(56) References Cited

U.S. PATENT DOCUMENTS

| | | | | |
|---|---|---|---|---|
| 4,127,786 A | * | 11/1978 | Volkrodt ................ | H02K 1/276 310/156.84 |
| 6,359,359 B1 | * | 3/2002 | Miura ..................... | H02K 1/276 310/156.08 |
| 7,876,014 B2 | * | 1/2011 | Lee ........................... | 310/156.53 |
| 8,030,817 B2 | * | 10/2011 | Sakai .................... | H02K 1/2766 310/156.43 |
| 8,044,548 B2 | * | 10/2011 | Sakai .................... | H02K 1/2766 310/156.36 |
| 2007/0126304 A1 | * | 6/2007 | Ito et al. .................... | 310/156.53 |
| 2007/0252468 A1 | * | 11/2007 | Lee ........................... | 310/156.53 |

(Continued)

FOREIGN PATENT DOCUMENTS

| | | |
|---|---|---|
| CN | 2602538 Y | 2/2004 |
| CN | 1713491 A | 12/2005 |
| JP | 2006280195 A | 10/2006 |

*Primary Examiner* — John K Kim
(74) *Attorney, Agent, or Firm* — Muncy, Geissler, Olds & Lowe, P.C.

(57) ABSTRACT

A rotor for a permanent magnet brushless motor includes a shaft, a rotor core fixed to the shaft, and magnets embedded in the rotor core. The rotor core defines a plurality of spaced first slots arranged in a circumferential direction thereof, and a plurality of spaced second slots, each second slot being located between two adjacent first slots and each first slot being located between two adjacent second slots. First permanent magnets are received in the first slots and second permanent magnets are received in the second slots. Each second magnet is located between two adjacent first magnets and each first magnet is located between two adjacent second magnets in the circumferential direction, and the first magnets are magnetized in radial directions of the rotor core and the second magnets are magnetized in the circumferential direction.

17 Claims, 2 Drawing Sheets

(56) References Cited

U.S. PATENT DOCUMENTS

| | | | |
|---|---|---|---|
| 2009/0236923 A1* | 9/2009 | Sakai | H02K 1/2766 310/156.43 |
| 2010/0060223 A1 | 3/2010 | Sakai et al. | |
| 2010/0171385 A1 | 7/2010 | Sakai et al. | |
| 2011/0115328 A1* | 5/2011 | Nakayama | H02K 1/2766 310/156.53 |
| 2011/0291515 A1* | 12/2011 | Li | H02K 21/16 310/156.53 |
| 2013/0002081 A1* | 1/2013 | Zhang et al. | 310/156.38 |

* cited by examiner

PERMANENT MAGNET ROTOR BRUSHLESS MOTOR

CROSS REFERENCE TO RELATED APPLICATIONS

This non-provisional patent application claims priority under 35 U.S.C. §119(a) from Patent Application No. 201110185544.6 filed in The People's Republic of China on Jun. 30, 2011.

FIELD OF THE INVENTION

This invention relates to a rotor for brushless permanent magnet motor, and in particular to a permanent magnet rotor, in which the magnets are embedded in the core of the rotor, commonly referred to as an internal permanent magnet (IPM) rotor.

BACKGROUND OF THE INVENTION

A brushless permanent magnet motor usually comprises a permanent magnet rotor and a stator with stator windings. The stator windings, when electrified, generate a rotating magnetic field to rotate the rotor. Rare earth magnets with high magnetic strength are commonly used for rotor magnets. However, with the price of rare earth magnets continuously increasing, ferrite magnets are used to replace rare earth magnets to reduce the cost. Surface mounted magnet motors with ferrite magnets, which have lower magnetic strength than rare earth magnets, cannot meet the requirements for some applications that need high energy density.

To meet the energy density improvement goals, internal permanent magnet (IPM) motors with high power density have been developed. In the IPM motor, the permanent magnets are usually radially embedded in the rotor core.

An objective of the present invention is to provide a new IPM rotor with high power density.

SUMMARY OF THE INVENTION

Accordingly, in one aspect thereof, the present invention provides a rotor for a permanent magnet brushless motor comprising: a shaft; a rotor core fixed to the shaft and defining a plurality of spaced first slots arranged in a circumferential direction thereof, and a plurality of spaced second slots, each second slot being located between two adjacent first slots and each first slot being located between two adjacent second slots; a plurality of first permanent magnets received in the first slots; and a plurality of second permanent magnets received in the second slots, wherein each second magnet is located between two adjacent first magnets and each first magnet is located between two adjacent second magnets in the circumferential direction, and the first magnets are magnetized in radial directions of the rotor core and the second magnets are magnetized in the circumferential direction.

Preferably, opposite end points of the outer surface of each first magnet is radially offset from the innermost points of two facing surfaces of the two adjacent second magnets.

Preferably, the second magnets radially overlap the corresponding first magnet.

Preferably, the thickness of the first magnets measured in the magnetized direction thereof is represented by T1, the thickness of the second magnets measured in the magnetized direction thereof is represented by T2, T1 being greater than T2.

Preferably, the ratio of T1 to T2 is less than 1.5.

Preferably, the radially outer ends of the second slots are open and the rotor core comprises protrusions extending into the outer ends of the second slots to abut against radially outer end surfaces of the corresponding second magnets.

Preferably, in cross section, the width of the first magnet measured in a direction perpendicular to the magnetized direction is greater than the thickness of the first magnet measured in a direction parallel to the magnetized direction.

Alternatively, in cross section, the width of the first magnet measured in a direction perpendicular to the magnetized direction is equal to the thickness of the first magnet measured in a direction parallel to the magnetized direction.

Preferably, each section of the rotor core located between two adjacent first magnets and a corresponding second magnet located between the first magnets has a width which is gradually reduced in the radial direction of the rotor core towards the shaft.

Preferably, the minimum width of each section is less than the thickness T2 of the radially inner end of the corresponding second magnet.

Preferably, the first and second magnets are made of the same material.

Preferably, the magnets are ferrite magnets.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
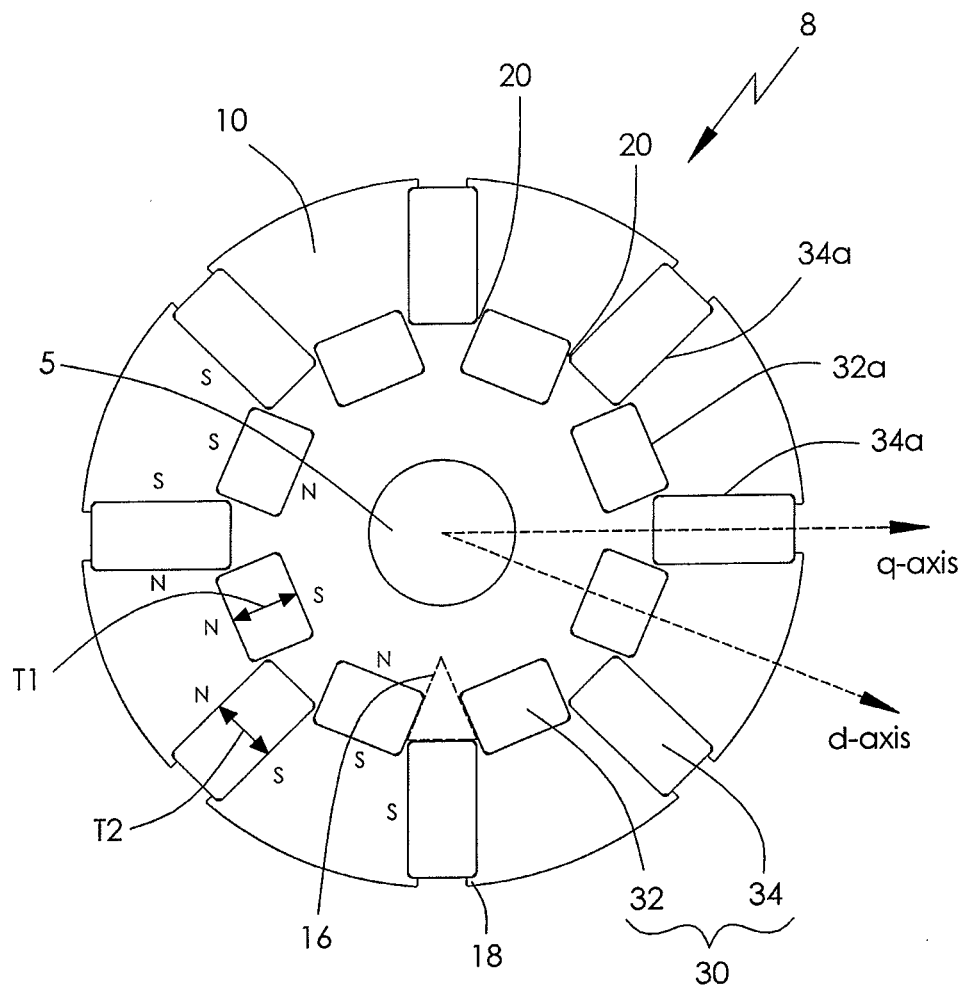
FIG. 1 is a cross sectional view of an IPM rotor in accordance with a first preferred embodiment of the present invention.

FIG. 1 illustrates a rotor 8 for a permanent magnet brushless electric motor according to the first preferred embodiment of the present invention. The rotor 8 comprises a shaft 5, a rotor core 10 fixed on the shaft 5 and permanent magnets 30 embedded in the rotor core 10.

Figure 2:
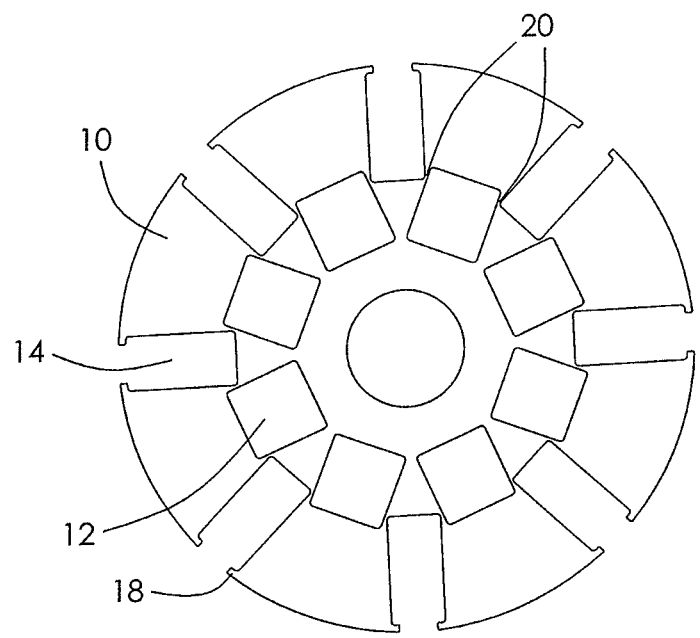
FIG. 2 illustrates a rotor core of the rotor of FIG. 1.

Referring also to FIG. 2, the rotor core 10 is made of a plurality of laminations made of magnetically conductive material such as iron or electrical steel and stacked in the axial direction of the shaft 5. The rotor core 10 defines a plurality of spaced first slots 12 arranged in a circumferential direction thereof, and a plurality of spaced second slots 14 also arranged in the circumferential direction of the rotor core 10. The first slots 12 are located closer to the shaft 5 than the second slots 14. The first and second slots 12, 14 each pass axially through the rotor core 10. Each first slot 12 is located between two adjacent second slots 14 and each second slot 14 is located between two adjacent first slots 12.

The magnets 30 comprises first magnets 32 respectively received in the first slots 12 and second magnets 34 respectively received in the second slots 14. The first magnets 32 are magnetized in a radial direction of the rotor while the second magnets 34 are magnetized in the circumferential direction of the rotor. The magnetized directions of two adjacent second magnets 34 are contrary to each other. Thus all the faces of the magnets facing together are of the same polarity, as shown in FIG. 1, i.e. they may be all North poles as indicated by the N to form a North pole of the rotor or all South poles as indicated by the S to form a South pole of the rotor, with the rotor poles alternating in polarity circumferentially of the rotor. The thickness of the first magnet 32 measured in the magnetized direction is presented as T1 and the thickness of the second magnet 34 measured in the magnetized direction is presented as T2. The thickness T1 is greater than the thickness T2. Preferably, the ratio of the thickness T1 to the thickness T2 is in the range of 1 to 1.5. Preferably, the first and second magnets 32, 34 are all ferrite magnets in order to reduce cost.

Two facing edges of every two adjacent first slots 12 and an inner edge of a corresponding second slot 14 located between the two adjacent first slots 12 are respectively located at three edges of an imaginary triangle as indicated by dashed line 16 in FIG. 1. Each section of the rotor core located between two adjacent first magnets 32 and a corresponding second magnet 34 located between the first magnets 32 has a width which is gradually reduced in the radial direction of the rotor core 10 towards the shaft. The minimum width of the section is less than the width of the inner end of the second magnet 34. The above arrangement allows the magnets 32, to apply a minimum centrifugal force on the rotor core 10 when the rotor rotates, thereby improving the mechanical strength of the rotor core 10.

Two adjacent second magnets 34 and a corresponding first magnet 32 located between the two magnets 34 constitute a general V shape. Preferably, opposite end points of the outer surface 32a (perpendicular to d-axis of the rotor) of the first magnet 32 is radially offset from the radially innermost points of the two facing surfaces (parallel to q-axis) 34a of the two adjacent second magnets 34 in order to reduce flux leakage via bridges 20 formed between the first magnet 32 and the second magnets 34. Preferably, the offset is in the radially outward direction such that the second magnets 34 partially radially overlap with the corresponding first magnet 32.

Preferably, the radially outer ends of the second slots 14 are open. The rotor core 10 comprises protrusions 18 extending into the outer ends of the second slots 14 to abut against the outer end surfaces of the corresponding second magnets 34.

As shown in FIG. 2, in the first embodiment, in the cross section of the rotor core 10, the width and depth of the first slots 12 are equal. Consequently, in cross section, the width of the first magnets 32 measured in a direction perpendicular to the magnetized direction is equal to the thickness of the first magnets 32 measured in a direction parallel to the magnetized direction are equal.

Figure 3:
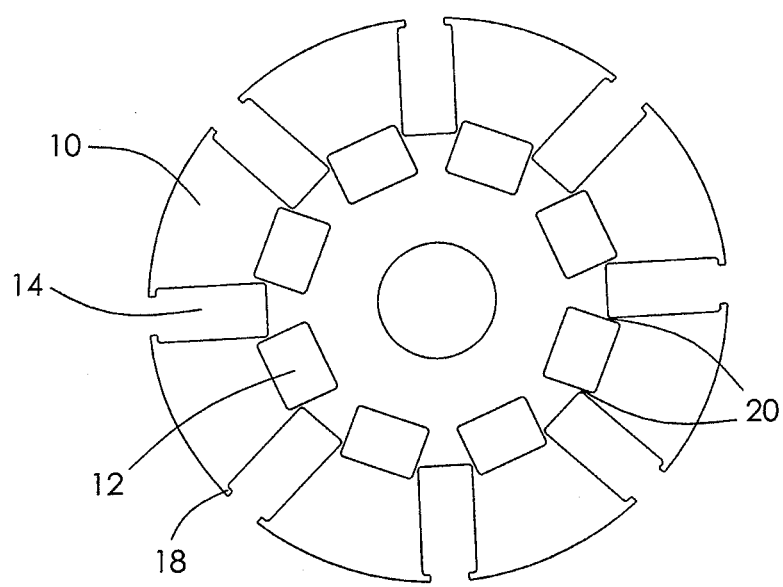
FIG. 3 illustrates a rotor core of a rotor according to a second embodiment.

Alternatively, in the second embodiment as shown in FIG. 3, in the cross section of the rotor core 10, the width of the first slot 12 is greater than the depth of the first slot 12. Consequently, in cross section, the width of the first magnet 32 measured in a direction perpendicular to the magnetized direction is greater than the thickness of the first magnet 32 measured in a direction parallel to the magnetized direction.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for a permanent magnet brushless motor comprising:
a shaft;
a rotor core fixed to the shaft and defining a plurality of spaced first slots arranged in a circumferential direction thereof, and a plurality of spaced second slots, each second slot being located between two adjacent first slots and each first slot being located between two adjacent second slots;
a plurality of first permanent magnets received in the first slots; and
a plurality of second permanent magnets received in the second slots and ends of the plurality of second permanent magnets adjacent to the shaft directly contacting with the rotor core,
wherein each second magnet is located between two adjacent first magnets and each first magnet is located between two adjacent second magnets in the circumferential direction, and the first magnets are magnetized in radial directions of the rotor core and the second magnets are magnetized in the circumferential direction, the first magnets located closer to the shaft than the second magnets,
wherein each section of the rotor core located between two adjacent first magnets and a corresponding second magnet located outside of the section has a width which is gradually reduced in the radial direction of the rotor core towards the shaft; and
wherein an angle formed by extending two facing sides of two adjacent first magnets is an acute angle.

2. The rotor of claim 1, wherein opposite end points of the outer surface of each first magnet is radially offset from the innermost points of two facing surfaces of the two adjacent second magnets.

3. The rotor of claim 2, wherein the second magnets radially overlap the corresponding first magnet.

4. The rotor of claim 1, wherein the first and second magnets each have a rectangular shape, the thickness of any position of the first magnets measured in the magnetized direction thereof is a fixed value and represented by T1, the thickness of any position of the second magnets measured in the magnetized direction thereof is a fixed value and represented by T2, T1 being greater than T2.

5. The rotor of claim 4, wherein the ratio of T1 to T2 is a fixed value and less than 1.5.

6. The rotor of claim 1, wherein the radially outer ends of the second slots are open and the rotor core comprises protrusions extending into the outer ends of the second slots to abut against two opposite end portions of the radially outer end surfaces of the corresponding second magnets.

7. The rotor of claim 1, wherein, in cross section, the width of the first magnet measured in a direction perpendicular to the magnetized direction, is greater than the thickness of the first magnet measured in a direction parallel to the magnetized direction.

8. The rotor of claim 1, wherein, in cross section, the width of the first magnet measured in a direction perpendicular to the magnetized direction, is equal to the thickness of the first magnet measured in a direction parallel to the magnetized direction.

9. The rotor of claim 1, wherein the minimum width of each section is less than the thickness T2 of the radially inner end of the corresponding second magnet.

10. The rotor of claim 1, wherein the first and second magnets are made of the same material.

11. The rotor of claim 10, wherein the magnets are ferrite magnets.

12. The rotor of claim 1, wherein, in cross section, the width of the first magnet measured in a direction perpendicular to the magnetized direction, is less than the width of the second magnet measured in a direction perpendicular to the magnetized direction.

13. The rotor of claim 1, wherein each second slot has an inner edge without contacting with the two facing edges of the two adjacent first slots, the inner edge of each second slot located between two adjacent first slots extends towards two opposite directions to form a first edge which contacts with two facing edges of the two adjacent first slots.

14. The rotor of claim 13, wherein the first edge cooperates with the two facing edges of the two adjacent first slots to form a triangle.

15. A rotor for a permanent magnet brushless motor comprising:
   a shaft;
   a rotor core fixed to the shaft and defining a plurality of spaced first slots arranged in a circumferential direction thereof, and a plurality of spaced second slots, each second slot being located between two adjacent first slots and each first slot being located between two adjacent second slots;
   a plurality of first permanent magnets received in the first slots; and
   a plurality of second permanent magnets received in the second slots,
   wherein each second magnet is located between two adjacent first magnets and each first magnet is located between two adjacent second magnets in the circumferential direction, and the first magnets are magnetized in radial directions of the rotor core and the second magnets are magnetized in the circumferential direction, the first magnets located closer to the shaft than the second magnets,
   wherein each section of the rotor core located between two adjacent first magnets and a corresponding second magnet located outside of the section has a width which is gradually reduced in the radial direction of the rotor core towards the shaft; and
   wherein an inner edge of every second slot located between two adjacent first slots extends towards two opposite directions to form a first edge which connect with two facing edges of the two adjacent first slots through bridges formed between the first magnet and two adjacent second magnets.

16. The rotor of claim 15, wherein the first edge cooperates with the two facing edges of the two adjacent first slots to form a triangle.

17. A rotor for a permanent magnet brushless motor comprising:
   a shaft;
   a rotor core fixed to the shaft and defining a plurality of spaced first slots arranged in a circumferential direction thereof, and a plurality of spaced second slots, each second slot being located between two adjacent first slots and each first slot being located between two adjacent second slots;
   a plurality of first permanent magnets received in the first slots; and
   a plurality of second permanent magnets received in the second slots,
   wherein each second magnet is located between two adjacent first magnets and each first magnet is located between two adjacent second magnets in the circumferential direction, and the first magnets are magnetized in radial directions of the rotor core and the second magnets are magnetized in the circumferential direction, the first magnets located closer to the shaft than the second magnets,
   wherein each section of the rotor core located between two adjacent first magnets and a corresponding second magnet located outside of the section has a width which is gradually reduced in the radial direction of the rotor core towards the shaft; and
   wherein the first and second magnets each have a rectangular shape, the thickness of the first magnets measured in the magnetized direction thereof is represented by $T1$, the thickness of the second magnets measured in the magnetized direction thereof is represented by $T2$, $T1$ being greater than $T2$, and the first magnets and second magnets are ferrite magnets.

* * * * *